United States Patent [19]
Fisher

[11] Patent Number: 5,485,563
[45] Date of Patent: Jan. 16, 1996

[54] SYSTEM FOR SCALING COMPUTERIZED IMAGES

[75] Inventor: Clay Fisher, Palo Alto, Calif.

[73] Assignee: Canon Information Systems, Inc., Costa Mesa, Calif.

[21] Appl. No.: 128,774

[22] Filed: Sep. 30, 1993

[51] Int. Cl.$^6$ .................................................. G06F 15/62
[52] U.S. Cl. ...................................................... 395/139
[58] Field of Search ..................................... 395/139, 133; 345/113, 127, 131; 382/47, 56

[56] References Cited

U.S. PATENT DOCUMENTS

| 5,293,469 | 3/1994 | Outa et al. | 395/133 |
| 5,317,680 | 5/1994 | Ditter, Jr. | 395/135 |

Primary Examiner—Phu K. Nguyen
Attorney, Agent, or Firm—Fitzpatrick, Cella, Harper & Scinto

[57] ABSTRACT

A system for building scaled images of an original in which a scaled image is sequentially built by scaling different portions of the original image and by combining the scaled different portions to obtain the scaled image. The system includes an image input section, an image portion selector, an image scaler, and a combiner for combining scaled images such as through a binary "OR" operation. The portion selector selects respective first and second portions of the original, and the scaler forms respective first and second images of the selected portions, both the first and second scaled images having the target size. The combiner combines the first and second images so as to obtain a scaled image, the amount of detail in the scaled image being superior to the amount of detail in either the first or second images.

49 Claims, 11 Drawing Sheets

FIG. 11

SYSTEM FOR SCALING COMPUTERIZED IMAGES

BACKGROUND OF THE INVENTION

1. Field of the Invention

The present invention relates to a system for scaling computerized graphic images and for displaying the scaled images thus obtained. More particularly, the invention concerns a system in which a scaled image is sequentially built by scaling overlapping, but different, portions of the original bitmap image and by combining the scaled different portions to obtain the scaled image.

2. Description of the Related Art

Recently, the user interface in a computer operating system has shifted from a text-based user interface to a graphical-based user interface. For example, a graphical user interface operating system such as a MicroSoft® Windows operating system displays "windows" of information; windows containing information of primary importance are ordinarily displayed overlapping over other windows of lesser importance. Options are presented to a user in the form of graphical "buttons" or icons, which a user may select by manipulation of a mouse or other pointing device. Upon selection of a desired icon, a corresponding computer function is performed which may entail replacing current windows with new overlapping windows.

Creation of graphical images, such as the overlapping windows or the icons in a graphical user interface, often involves scaling a full-size bitmap image down to a reduced size. For example, a computer operator may decide that one area of his display screen of lesser importance than other areas, and he may desire to have that one area reduced in size and moved to a corner of the display screen so that the operator may refer to that one area without needlessly cluttering the display screen. Or, when processing windows, the graphical user interface operating system may be used to scale one window so that a new window may be displayed side-by-side with the old window. Or, when creating an icon, a computer programmer may prefer to digitally scan a full-size image and scale the image down to a size suitable for a graphical "button".

FIGS. 10 and 11 are views for explaining some of these situations in which it is desired to scale a digital image. Thus, in FIG. 10, a graphical user interface operating system first displays a window 101a on display screen 102a. In response to a command to display a new window, the operating system scales window 101a and repositions it to the lower right hand corner of the screen, as shown at 101b and 102b, respectively. The operating system then displays new window 103. Scaling thus permits the new window 103 to be displayed side-by-side with old window 101b.

FIG. 11 is a view of a computer menu from a graphical user interface that retrieves images of documents from an optical disk on which several thousand of such documents are stored. As shown in FIG. 11, area 111 of display screen 110 includes 25 icon buttons, such as button 111a, arranged in a 5×5 array. Each of the icons is formed by retrieving an original image representative of the subject matter of the documents, and by scaling the original image to the size of the icon. By selecting various combinations of the icons, documents may be retrieved from the optical disk based on desired subject matter.

When programming a computer to perform functions like those described above, a computer programmer ordinarily relies on a software developers kit ("SDK"). The SDK includes software tools, such as pre-programmed library routines, which ease the programming burden by allowing the programmer to program the computer by simply choosing the tools needed to perform the desired functions. Thus, for example, there are tools which allow a programmer to write programs that display data in a window, to more windows around a display screen, to display a menu bar of icons, etc. There are also tools which scale a bit map image to any desired size. In the MicroSoft® Windows SDK, such a scaling routine is the "StretchBit()" routine.

Using scaling routines included in SDK's provides convenient tools for scaling images, since the programmer need not write his own scaling routine. There are, however, drawbacks to their use.

More particularly, such standard scaling routines are ordinarily optimized for speed rather than for preservation of scaled image detail. Thus, to reduce the size of an original, a typical scaling routine will simply discard unneeded pixels of the bitmap image. FIG. 12 illustrates this operation in a situation where it is desired to reduce an original image 120 to half-size. As shown in FIG. 12, the scaling routine analyzes the pixels 124 of the image to determine which pixels are needed and which pixels are unneeded. In a situation where the size of the original is to be reduced by exactly one-half, then only one pixel 125 in a 2×2 pixel area is needed; the remaining three pixels are unneeded. The unneeded pixels are removed resulting in a scaled image 127. However, since unneeded pixels have simply been removed, as shown in magnified inset 126, it is seen that the scaled image, though of the correct size, retains little detail of the original image.

Accordingly, except in uncritical applications where the resulting poor image detail is acceptable, it has not heretofore been possible to use standard scaling routines provided with graphical user interface SDK's to scale bitmap images. In situations where poor image detail is unacceptable, other, more sophisticated, scaling routines are needed.

SUMMARY OF THE INVENTION

It is an object of the present invention to address the foregoing difficulties by providing a system which enhances the performance of scaling routines, such as the standard scaling routine in a graphical user interface SDK.

According to the invention, scaled images are built by sequentially scaling different, but overlapping, portions of the original image and by combining the scaled different portions to obtain the scaled image. Thus, according to one aspect of the invention, a scaled image of an original is built by scaling the original to form a first image whose size is the size of the scaled image. An overlapping but different portion of the original image is then scaled to form a second image whose size is also the size of the scaled image. The same scaling routine is used to obtain both the first and second images, and the portion of the original that is scaled is selected so that the second image is different from the first image. Ordinarily, this means that the portion is selected to be nearly the entire original image, but with a few rows and columns of pixels of the image omitted, for example, a few columns and rows at the edge. Such a selection procedure will ensure that the first image is different than the second image. The first and the second images are then combined, such as by "ORing" the first and second images, to build the scaled image. The process of selecting a different portion of the original for scaling and combining the scaled different portion with other scaled different portions may be repeated, with each repetition enhancing the detail of the scaled image.

In the preferred embodiment of the invention, the graphical user interface operating system is a MicroSoft® Windows operating system, and the scaling routine is the "StretchBit" routine in the MicroSoft® SDK. An optical disk which stores several thousand document images also stores full size image icons representative of different subject matter of the documents stored on the disk. The full size icons are retrieved from the document disk and scaled as described above so as to obtain scaled icons for use in a graphical user interface such as that shown in FIG. 11. A computer operator selects scaled icons in accordance with desired document retrieval parameters, and documents fitting the retrieval parameters are retrieved and presented for use.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 10 and 11 are views showing a computer display screen which includes scaled images.

DETAILED DESCRIPTION OF THE INVENTION

Figure 1:
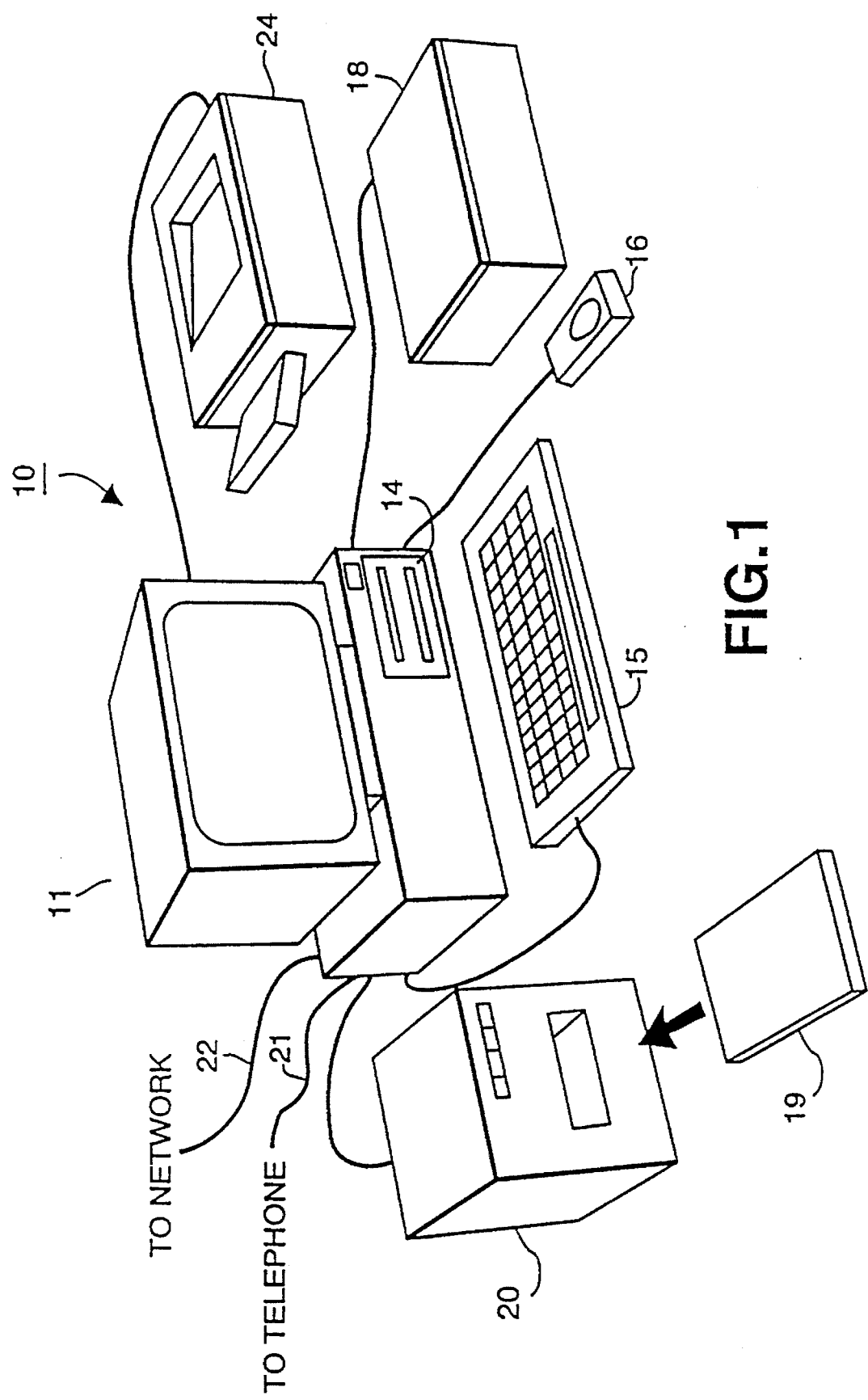
FIG. 1 is a perspective view of the external appearance of an apparatus according to the invention.

FIG. 1 is a view showing the outward appearance of a representative embodiment of the invention. Shown in FIG. 1 is computing equipment 10 such as an IBM-PC or PC-compatible computer having a graphical user interface operating system such as a MicroSoft Windows operating system. The computing equipment 10 is provided with a display screen 11 such as a color monitor. Computing equipment 10 further includes a mass storage device such as computer disk drive 14 for storing data files such as black-and-white, halftone and color bitmap images; and for storing application program files which contain stored program instruction sequences by which computing equipment 10 manipulates data files and presents data in those files to a computer operator via display screen 11. For example, the application programs on disk drive 14 may include an application program to access data on an optical disk, or other information processing programs.

A keyboard 15 is connected to computing equipment 10 to permit input of text data and to permit operator selection and manipulation of data displayed on display screen 11. Likewise, pointing device 16 such as a mouse or the like is provided to permit selection and manipulation of objects on the display screen. Scanner 18 scans documents or other images and provides bitmap images of those documents to computing equipment 10. Those images may be used immediately by computing equipment 10, or computing equipment 10 may store the images in disk drive 14 or on an optical disk such as disk 19 via optical disk drive 20. Bitmap image data may be retrieved from optical disk 19 or computer disk drive 14 for subsequent processing by computing equipment 10.

Other means for supplying bitmap image data and other data may be provided, such as telephone link 21 via an unshown modem, or a network link 22. Likewise, a removable floppy disk drive may be provided, or digital or analog video information may be input via an unshown video interface.

Printer 24 is provided for outputting information processed by computing equipment 10.

In accordance with computer operator instructions, and under the control of the graphic user interface operating system, stored application programs are selectively activated to process and manipulate data. For example, and as described in more detail below, an optical disk access program may be activated to permit an operator to scan in document images via scanner 18 and store them to optical disk 19, and to retrieve scanned-in documents from optical disk 19 in accordance with retrieval parameters. Other application programs such as image editing programs, word processing programs, spreadsheet programs, multimedia message management programs, and similar information processing programs may also be provided for operator selection and use.

Figure 2:
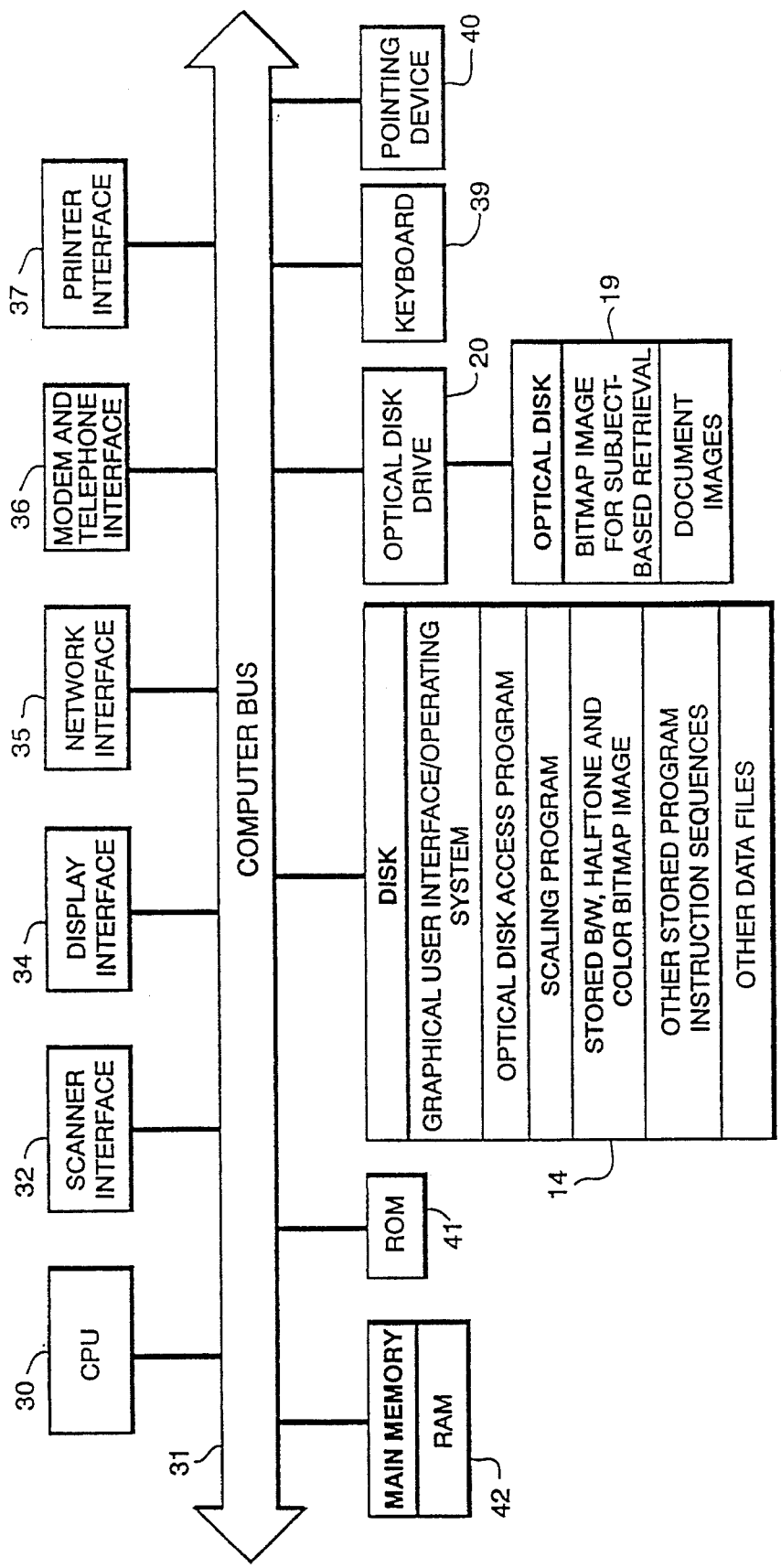
FIG. 2 is a block diagram of the FIG. 1 apparatus.

FIG. 2 is a detailed block diagram showing internal construction of computing equipment 10. As shown in FIG. 2, computing equipment 10 includes a central processing unit (CPU) 30 such as an 80386 or a reduced instruction set computer (RISC) interfaced to computer bus 31. Also interfaced to computer interface 31 is scanner interface 32 for interfacing to scanner 18, display interface 34 for interfacing to display 11, network interface 35 for interfacing to network line 22, modem and telephone interface 36 for interfacing to telephone line 21, printer interface 37 for interfacing to printer 34, keyboard interface 39 for interfacing to keyboard 15, and pointing interface 40 for interfacing with pointing device 16.

Read only memory (ROM) 41 interfaces to computer bus 31 so as to provide CPU 30 with specialized and invariant functions such as start-up programs or BIOS programs. Main memory 42 provides CPU 30 with random access memory storage both for data and application programs, as required. In particular, when executing stored program instruction sequences, CPU 30 normally loads those instruction sequences from disk 14 (or other program storage medium) into main memory 42 and executes those stored program instruction sequences out of the main memory.

Figure 11:
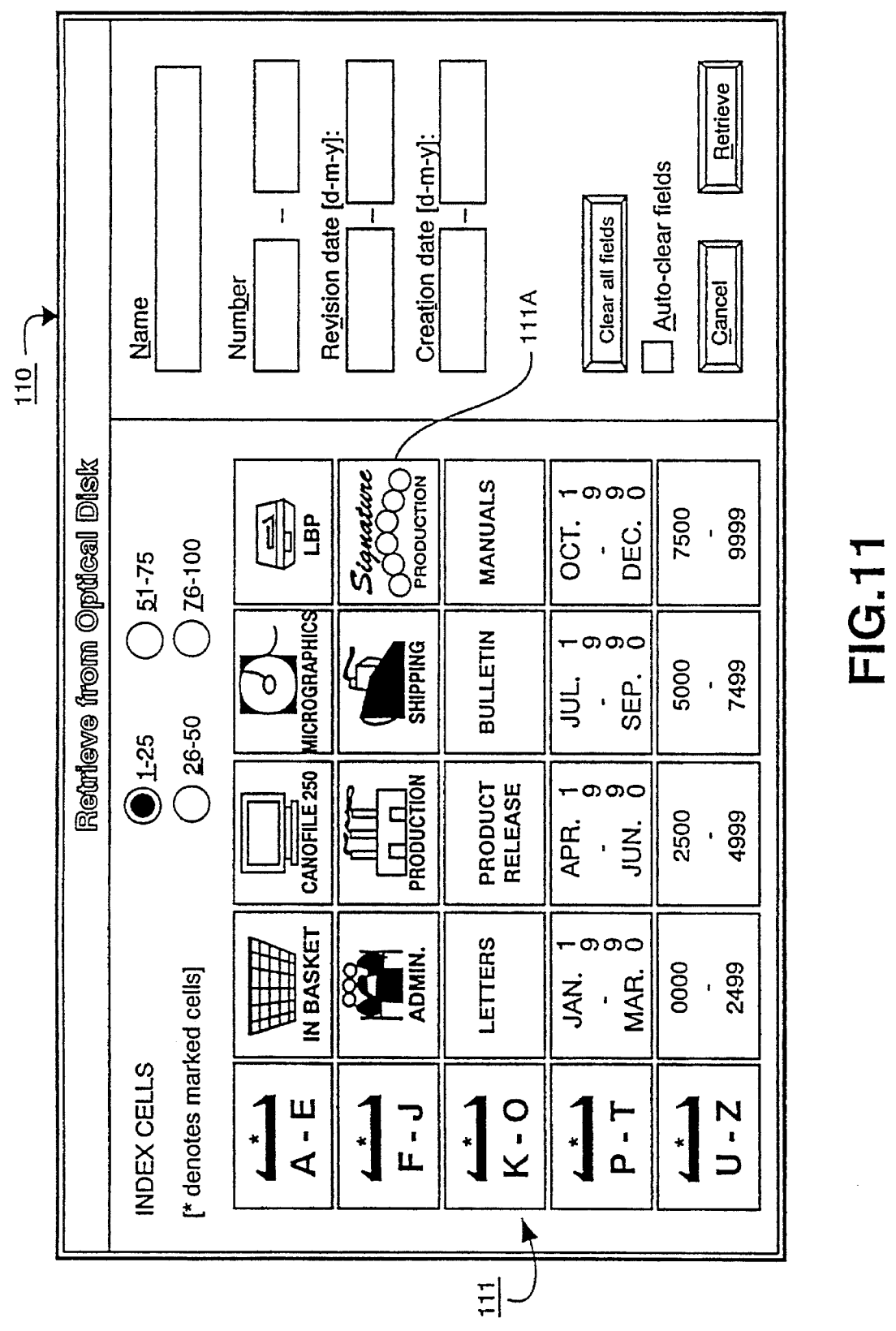

As mentioned above, optical disk 19 includes several thousand document images which may be stored under operator control or retrieved based on retrieval parameters. Typically, optical disk 19 also includes bitmap images which graphically represent the subject matter of the documents stored on the disk. As described more fully below, those bitmap images are retrieved and scaled for inclusion in a menu display screen, such as that shown in FIG. 11, to assist the operator in specifying the document retrieval parameters.

As further mentioned above, computer disk drive 14 includes data files such as data files representing black-and-white, halftone and color bitmap images which may require scaling before display. In addition, disk drive 14 includes stored program instruction sequences such as the aforementioned graphical user interface operating systems and an optical disk access program. Disk drive 14 also includes stored program instruction sequences for scaling bit map images, as described more fully below.

Figure 3:
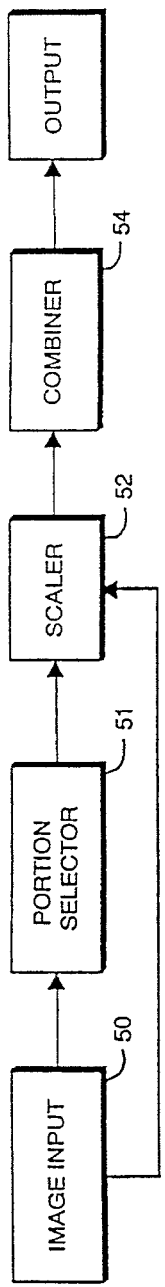
FIG. 3 is a functional block diagram of a system for building scaled images of an original.

FIG. 3 is a functional representation of stored program instruction sequences which provide the desired scaling function. As shown in FIG. 3, the scaling system includes an image input section 50 by which original images are provided to the scaling system. Images may be input to image input section 50 by a variety of means, for example, from the subject-based bitmap images stored on optical disk 19, from the bitmap images stored on computer disk drive 14, from scanner 18, or from network or telephonic interfaces 22 and 21, respectively. Likewise, images may be generated during execution of other application programs, and it may, for example, be desired to input into section 50 a portion of the current display screen 11 so that that portion may be scaled and repositioned to a different area of the screen.

A portion selector 51 is provided to select different portions of the image that was input into image input section 50. The selected portion, or the entire image, is provided to scaler 52. Preferably, scaler 52 is a scaling routine provided with the SDK for the graphical user interface operating system, but other scaling routines may be used if desired.

Scaled images are provided to combiner 54 which combines newly-scaled portions of the original with already-scaled portions of the originals. Combining newly-scaled portions with already-scaled portions enhances details of the scaled images, and the resulting scaled image is stored for output, such as in an unshown screen memory in display interface 34.

Figure 4:
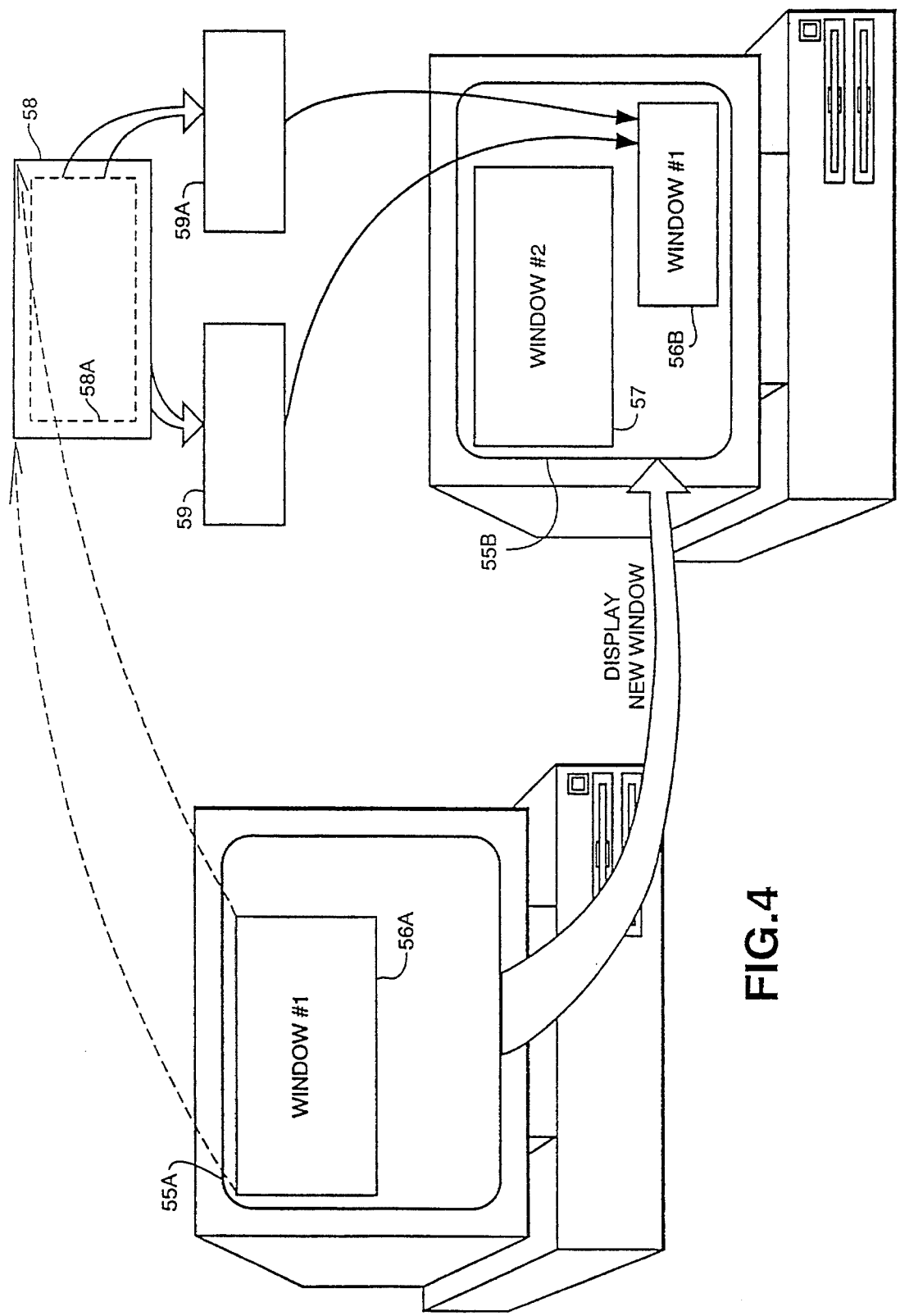
FIG. 4 is a view for explaining operation according to the invention.

FIG. 4 is a view for explaining operation of the apparatus in a situation where it is desired to scale an image, such as a window in a graphical user interface operating system, so that the image can be repositioned for display side-by-side with another image. Thus, as shown in FIG. 4, the graphical user interface operating system has displayed window 56a on the screen 55a of display screen 11. In response to a command to display a new window, it is desired to scale window 56a and reposition it to the lower right hand corner of the screen, as shown at 56b, and to display new window 57 side-by-side with scaled window 56b.

Figure 5:
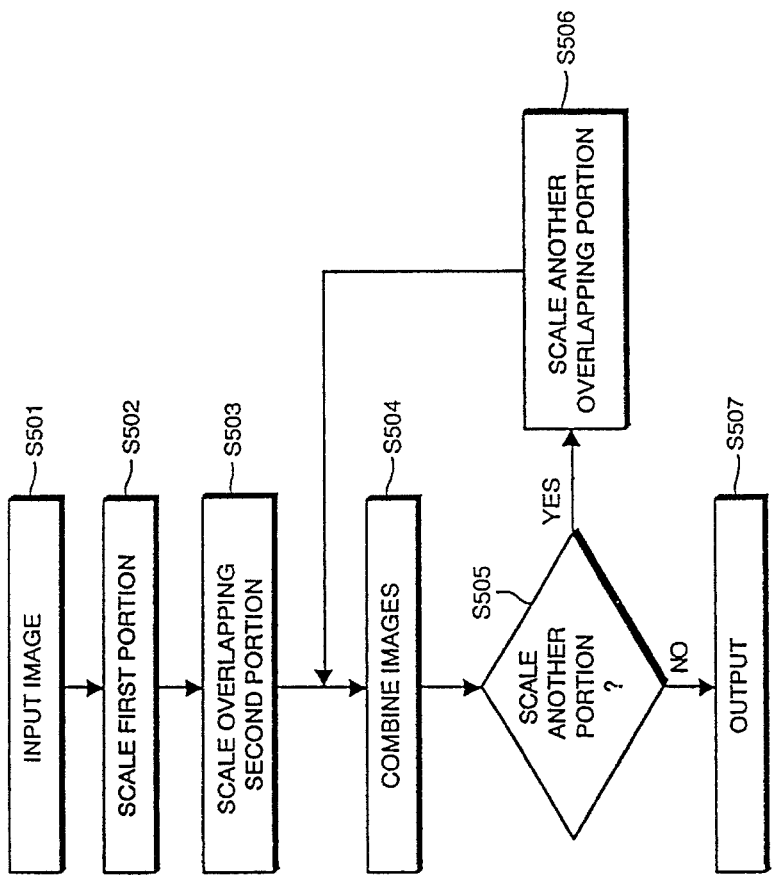
FIG. 5 is a flow diagram illustrating operation of the FIG. 4 embodiment.

FIG. 5 is a flow diagram for explaining how image 56a is scaled so as to yield scaled image 56b. The process steps shown in FIG. 5 are executed in accordance with stored program instruction steps stored on computer disk drive 14 and executed by CPU 30 out of main memory 42b.

As shown at step S501, the image, here window 56a, is input to image input device 50. In step S502, a first portion of the image is scaled. Thus, as shown in FIG. 4, a first portion 58, which in this case is the entire window 56a, is scaled so as to yield first scaled image 59. In step S503, a second, overlapping, portion of the image is selected by portion selector 51 and scaled by scaler 52. How portions are selected for scaling is described in more detail hereinbelow, but in general the portion is selected so that it is different from other portions but overlaps those other portions. For example, portions may be selected by including substantially all of the image and by omitting a few rows and columns from the image. Thus, as shown in FIG. 4, a second different but overlapping section 58a is selected and scaled so as to yield second scaled image 59a. In step S504, the first and second images are combined, such as by "ORing" the scaled images pixel by pixel.

Step S505 determines whether another portion of the image should be selected and scaled. More specifically, image detail in the scaled image can be enhanced simply by combining first and second scaled images, but further detail enhancements are possible if further portions of the original image are selected and scaled. If it is desired to select and scale another portion, then flow advances to step S506 in which another portion of the image is selected by portion selector 51 and scaled by scaler 52, whereafter the newly-scaled image is combined in step S504. On the other hand, if no further portions of the image are to be selected for scaling, the scaled images output in step S507 as shown at 56b.

Figure 6:
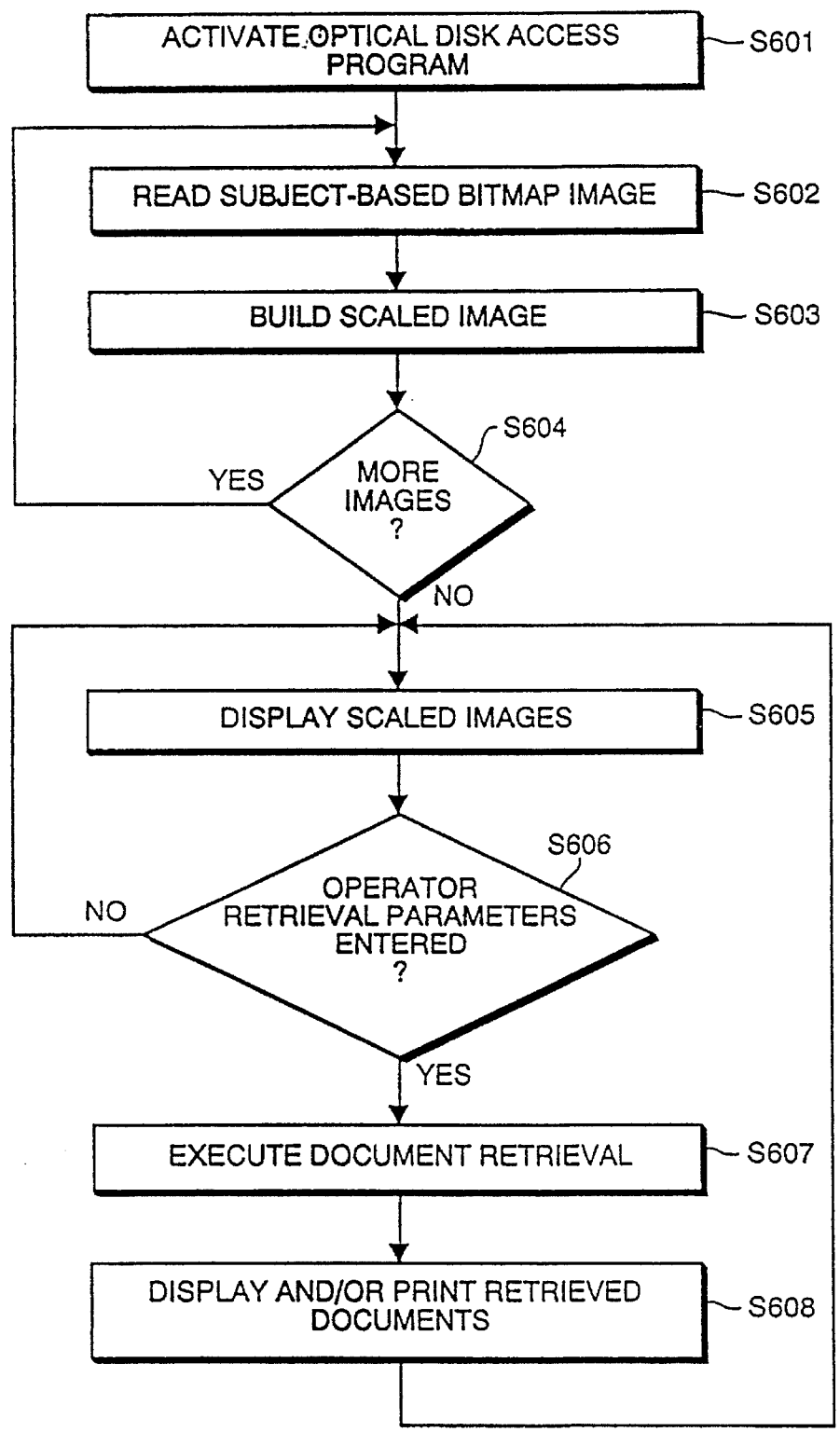
FIG. 6 is a flow diagram illustrating operation according to another embodiment of the invention.

FIG. 6 is a flow diagram for explaining operation of the apparatus according to another embodiment of the invention. The process steps shown in FIG. 4 are executed in accordance with stored program instruction steps stored on computer disk drive 14 and executed by CPU 30 out of main memory 42.

As shown in FIG. 6, in step S601, an operator operates the optical disk access program, in response to which CPU 30 retrieves the optical disk access program from disk drive 14 and, under the control of the graphical user interface operating system, loads the access program into main memory 42. Execution of the optical disk access program then commences, whereupon in step S602 CPU 30 reads subject-based bitmap images from optical disk 19. As mentioned above, the subject-based bitmap images are graphical images representative of the subject matter under which various document images stored on the optical disk are classified.

In step S603, CPU 30 builds scaled images from the bitmap images retrieved in step S602. More particularly, the size of the bitmap images retrieved in step S602 is ordinarily inappropriate for display on display 11. Typically, the images are too large and must be reduced. Accordingly in step S603, a scaled image is built by scaling different portions of the original bitmap image and by combining the scaled different portions to obtain the scaled image.

Figure 7:
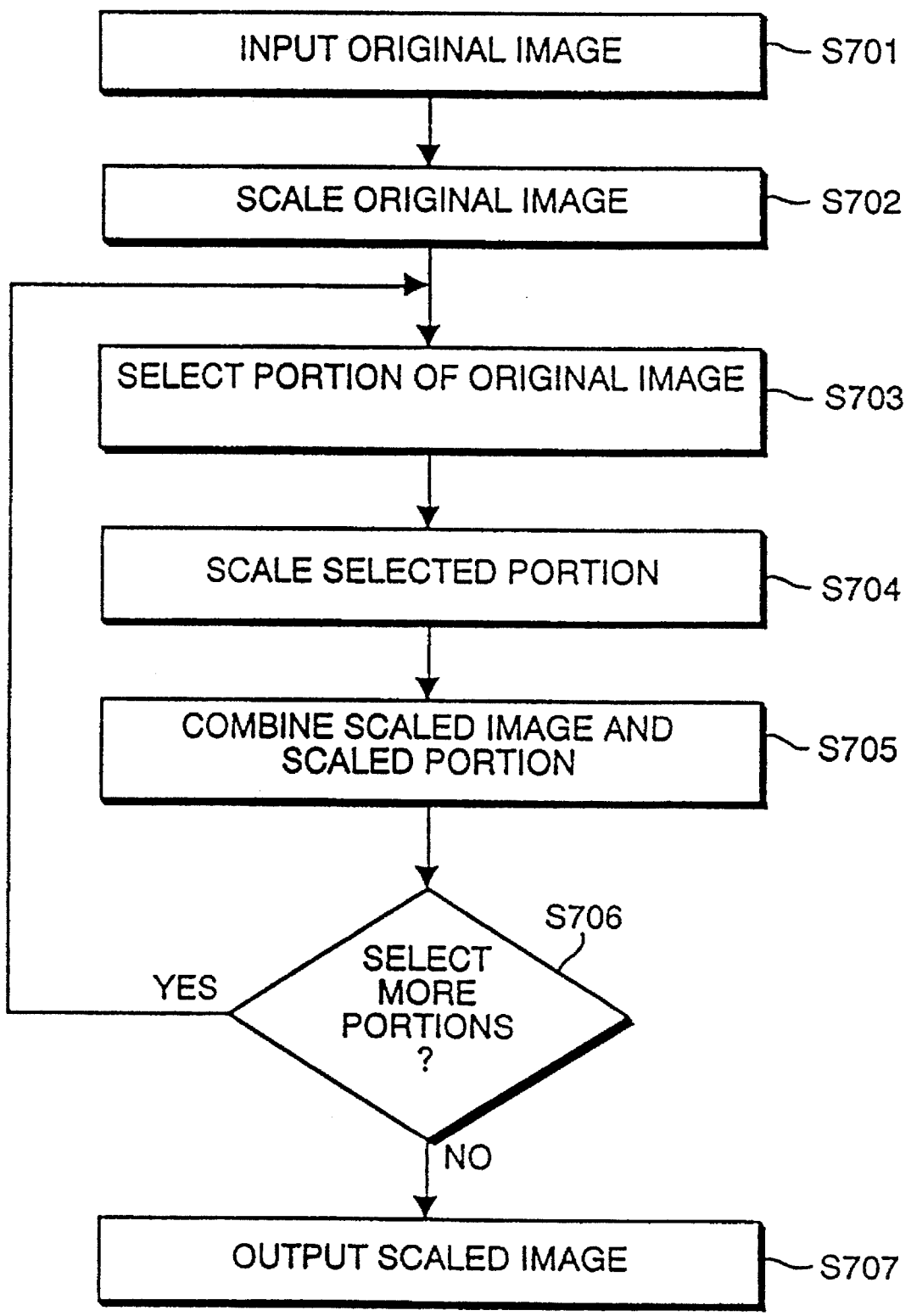
FIG. 7 is a detailed flow diagram showing how a scaled image is built from an original.

FIG. 7 is a flow diagram illustrating the process by which scaled images are built. In step S701, an original image is input by input section 50. In step S702, the original image is scaled by scaler 52 so as to obtain a first scaled image. As mentioned above, scaler 52 is preferably the standard scaling routine provided with the SDK for the graphical user interface operating system, but more generally, any scaling routine may be used. Thus, as shown in FIG. 8, original image 60 is scaled in step S702 so as to obtain first scaled image 61.

Figure 8:
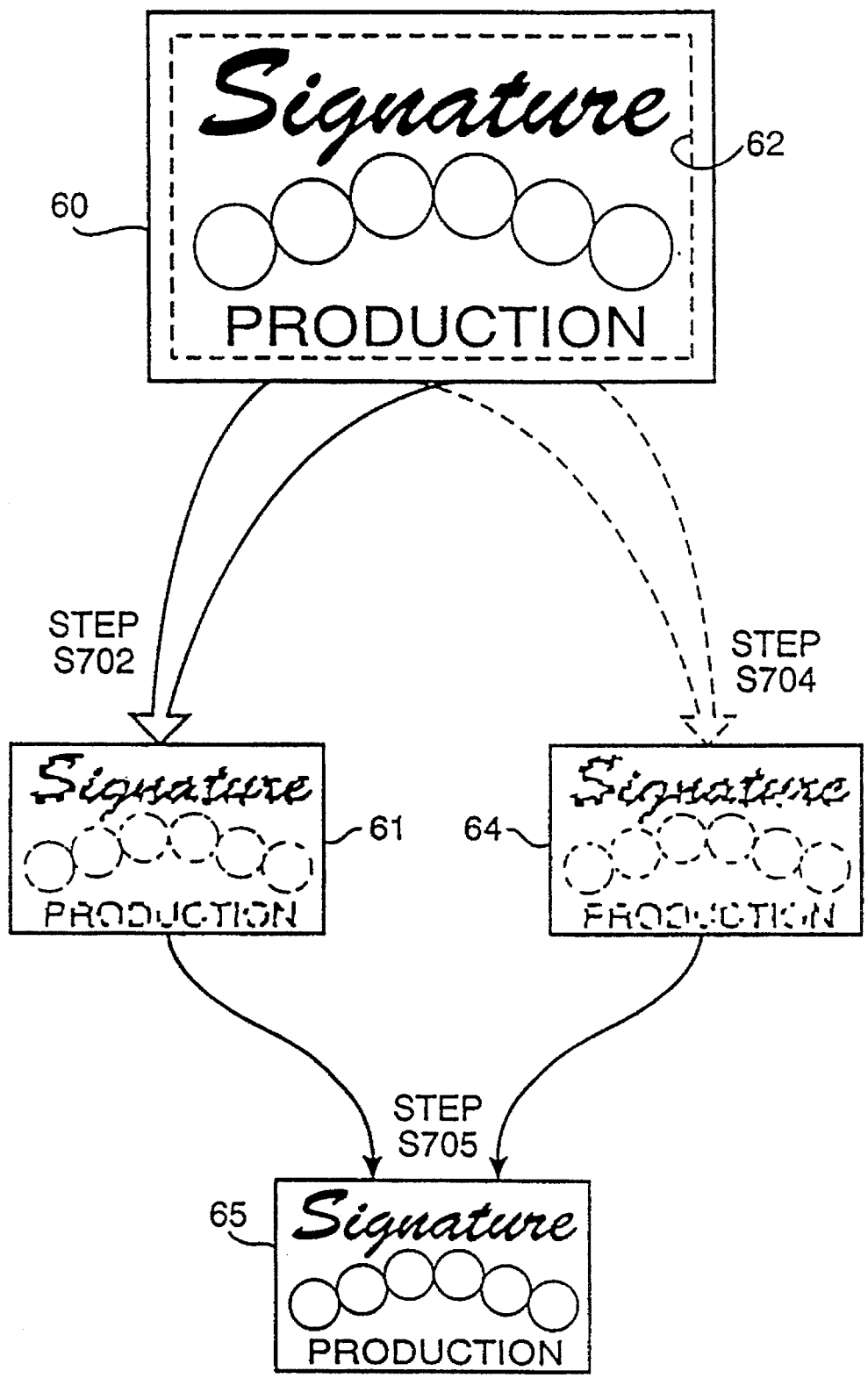
FIG. 8 is a view for illustrating how a scaled image is built from an original.

In step S703, a portion of the original image is selected, such as portion 62 shown in FIG. 8. The selected portion is nearly the entire original image, but with a few rows and columns of pixels omitted from the edge. More precise guidance for how the portion is selected is provided hereinbelow, but in general the portion is selected so that it is different from the portion selected in step S702 but so that it overlaps that portion.

In step S704, the scaler 52 scales the selected portion so as to obtain a second scaled image whose size is also the target size. Thus, as shown in FIG. 8, selected portion 62 is scaled so as to obtain second scaled image 64. As mentioned above, the second scaled image has the same size (for example, length by width) as the target size. Since only a portion of the original image was scaled, however, this means that scaler 52 applies different scale factors when scaling to obtain the first image and when scaling to obtain the second image.

In step S705, combiner 54 combines the first scaled image and the second scaled image so as to obtain an enhanced scaled image. In the embodiment described here, combiner 54 combines the two images through a simple binary "OR" operation. Other combining operations may be used to yield different effects. For example, if it is desired to invert the image (i.e., replace black for white), then combiner 54 may combine the first and second images so as to obtain the complement of the binary "OR" operation.

Here, and as shown in FIG. 8, first image 61 is combined with second image 64 so as to obtain enhanced image 65 which is the desired scaled image. Because portion 62 was selected so as to obtain a second scaled image 64 which is different from first scaled image 61, the result of step S705's combining is to "fill-in" and otherwise enhance pixels that are missing in each of the images so as to obtain the enhanced image shown at 65.

If desired, the scaled image may further be enhanced by selecting more portions of the original image as shown at step S706 and repeating steps S703 through S705. For each scaling and combining step, since the portion scaled is selected so as to obtain a scaled image that is different from that previously obtained, each such repetitive cycle builds an image that is further enhanced from previous cycles.

When no more portions are to be selected, flow advances to step S707 in which the scaled image is output.

Reverting to FIG. 6, scaled images are built for each subject-based bitmap image on optical disk 19 as shown at step S604. When all such scaled images are built, flow advances to step S605 in which the scaled images are displayed in a graphical user interface such as that illustrated in FIG. 11. As described above, the graphical user interface of FIG. 11 provides a computer user with the capability to define document retrieval parameters based on the subject matter in which the operator is interested.

After the operator enters retrieval parameters, flow advances from step S606 to step S607 in which CPU 30 executes document retrieval. More particularly, CPU 30 retrieves those documents stored on optical disk 19 which satisfy the retrieval parameters entered by the operator. In step S608, those documents are displayed on display 11 and, if desired, printed on printer 24. Flow then returns to step S605 in which the graphical user interface for document retrieval is again displayed to permit the operator to retrieve further documents.

The manner in which portion selector 51 selects portions of images will now be explained in more detail. As mentioned above, portion selector 51 selects different bdt overlapping portions of the image. Generally, this can be accomplished by varying the source dimensions of the image that are passed to the scaling routine, such as by selecting nearly all of the original image but omitting a few rows and columns at the extreme edges of the image. Particularly in cases where image reduction by a factor of two is desired, it has been found that omitting rows and columns according to a "pairing by twos" technique achieves the desired result of obtaining scaled portions of images that differ from one another.

Pairing by twos proceeds by omitting rows and columns of pixels such that the number of omitted rows of pixels differs from the number of omitted columns by two. As a concrete example, assume that the original image, or portions thereof, are to be scaled four times (i.e., four scaled different portions of the image are to be combined to form the enhanced scaled image). Then, assuming that the original image is X-pixels wide by Y-pixels high, portions of the original image should be selected as follows:

(X)—by—(Y)

(X)—by—(Y-2)

(X-2)—by—(Y)

(X-2)—by—(Y-2)

Thus, pairing by twos involves selecting portions of the original image by omitting rows and columns such that the number of rows omitted differs from the number of columns omitted by two. In addition, both the original image and a portion of the original image from the smallest number of rows and columns omitted is also subject to scaling.

Pairing by twos can be generalized such that if N is the number of times the scaling function is used to produce a single scaled bitmap (where N=4, 6, 8, . . . ) then portions of the original image should be selected as follows:

$$(X) - by - (Y)$$
$$(X-1) - by - (Y-3) \qquad (X-3) - by - (Y-1)$$
$$(X-2) - by - (Y-4) \qquad (X-4) - by - (Y-2)$$
$$\vdots \qquad \qquad \vdots$$
$$\left(X - \frac{N-4}{2}\right) - by - \left(Y - \frac{N}{2}\right) \qquad \left(X - \frac{N}{2}\right) - by - \left(Y - \frac{N-4}{2}\right)$$
$$\left(X - \frac{N}{2}\right) - by - \left(Y - \frac{N}{2}\right)$$

Figure 9:
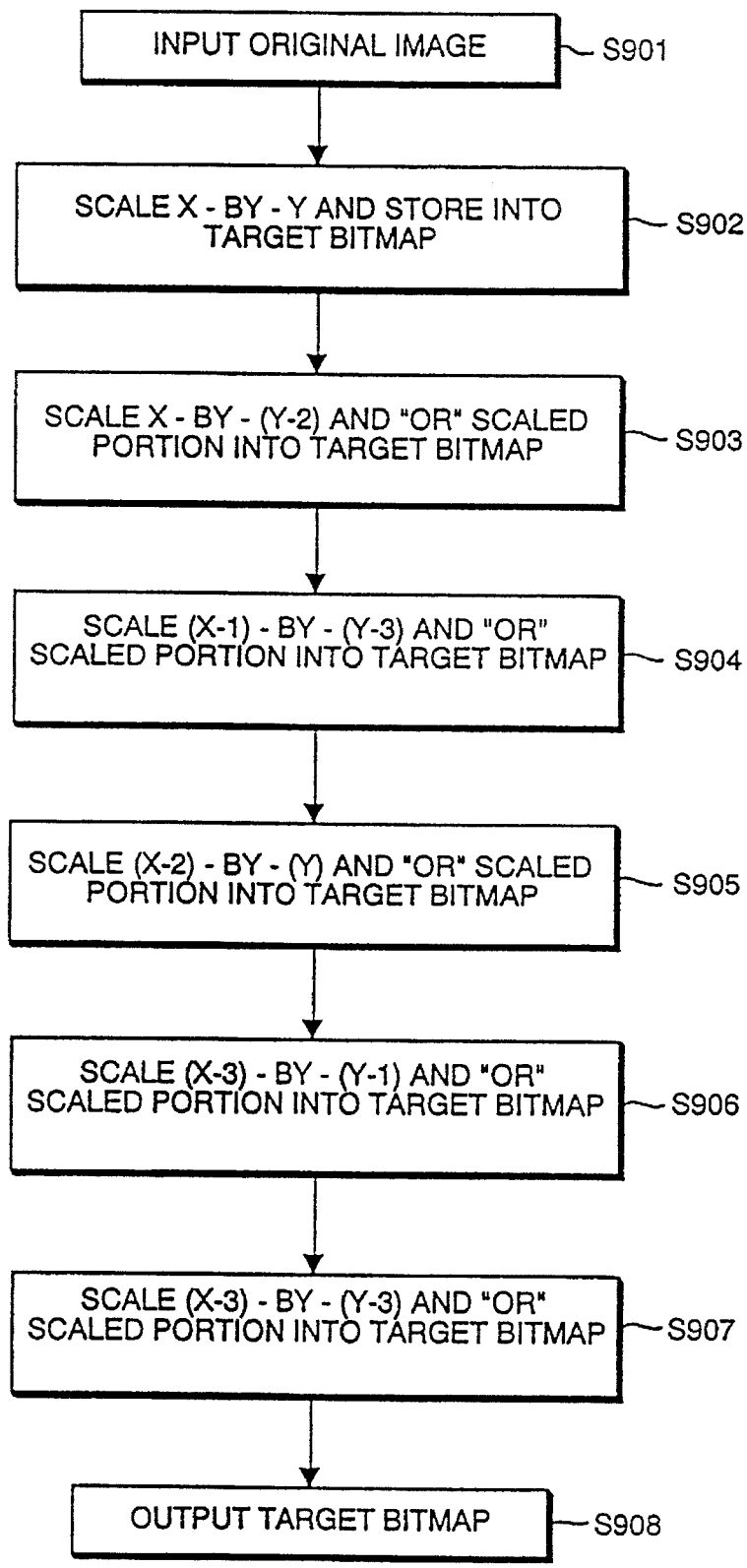
FIG. 9 is a flow diagram showing .how scaling may be repeated for different portions of an original to enhance details in the scaled image.
Figure 10:
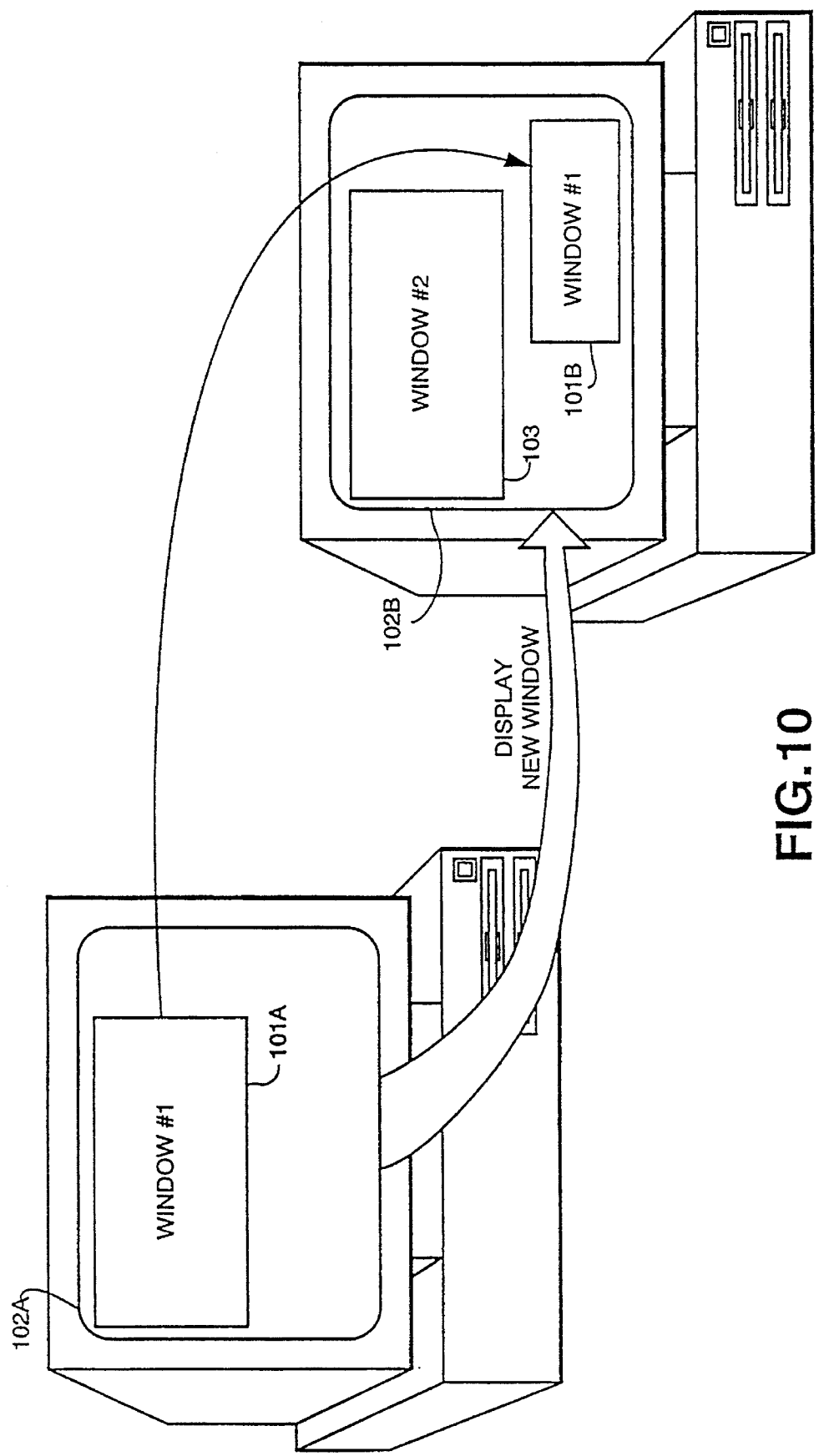
Figure 12:
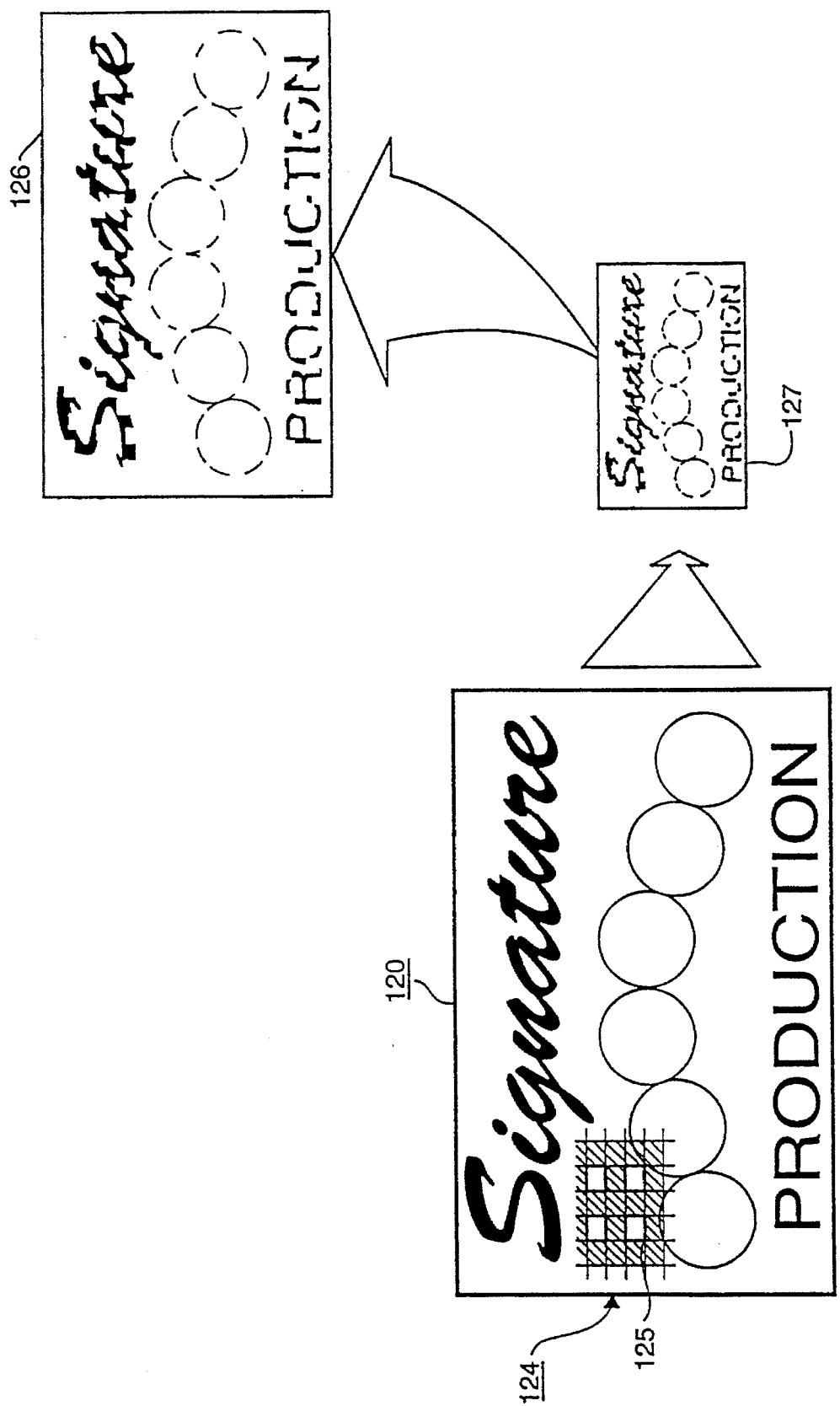
FIG. 12 is a view for explaining prior art scaling routines.

FIG. 9 is a flow diagram showing a specific example of pairing by twos in a situation where N=6. Experimentally, it has been found that for image reduction by a factor of two, pairing by twos yields acceptably detailed scaled images with no appreciable increase in detail beyond N=6. Thus, in step S901, the original image is input. In step S902, the entire original image (X—by—Y) is scaled and the resulting scaled image stored into the target bitmap. In steps S903 through S907, portions of the original image are selected in accordance with pairing by twos, the selected portions are scaled, and the resultant scaled image is "ORed" into the target bitmap. In step S908, the target bitmap is output as the enhanced scaled image.

While not confirmed experimentally, it is expected that pairing by threes would yield good results when reducing an image by a factor of approximately three; likewise, for reducing an image by a factor of approximately four and above, pairing by fours and above is also expected to yield good results.

Although the foregoing has been explained with respect to processing black-and-white images, processing of gray scale and color images is included in the scope of the appended claims.

What is claimed is:

1. Method for building a scaled image of an original comprising the steps of:

scaling a first portion of the original so as to form a first image whose size is the target size of the scaled image;

scaling a second portion of the original so as to form a second image whose size is also the target size of the scaled image, the second portion overlapping the first portion; and combining the first and second images to form the scaled image.

2. A method according to claim 1, wherein said combining step includes the step of combining the first and second images with a binary OR operation.

3. A method according to claim 1, wherein the first portion is the entire original image and the second portion is substantially the entire original image.

4. A method according to claim 1, wherein the first and second portions are each comprised by substantially the entire original image.

5. A method according to claim 1, further comprising the step of selecting the first and second portions.

6. A method according to claim 5, wherein said selecting step includes the step of pairing by twos.

7. A method according to claim 5, wherein said selecting step includes the step of varying source dimensions of the original image.

8. A method according to claim 5, wherein said selecting step includes omitting rows and columns of pixels from the original.

9. A method according to claim 5, wherein said selecting step is designed to yield first and second scaled images that differ from each other.

10. A method according to claim 1, further comprising the step of repeatedly scaling additional portions of the original so as to obtain additional images whose size is the target size of the scaled image, and combining newly-scaled portions with already-scaled portions.

11. Method for displaying scaled images of an original comprising the steps of:

executing an application program written using functions from a software development kit, the functions including a scaling function;

designating an original image which is to be scaled to a target sized image;

executing the scaling function so as to obtain a first scaled image from a first portion of the original, the size of the first scaled image being the same as the target size;

executing the scaling function so as to obtain a second scaled image from a second portion of the original, the second portion overlapping the first portion, the size of the second scaled image being the same as the target size;

combining the first and second images to form the scaled image; and displaying the scaled image with the application program.

12. A method according to claim 11, wherein said combining step includes the step of combining the first and second images with a binary OR operation.

13. A method according to claim 11, wherein the first portion is the entire original image and the second portion is substantially the entire original image.

14. A method according to claim 11, wherein the first and second portions are each comprised by substantially the entire original image.

15. A method according to claim 11, further comprising the step of selecting the first and second portions.

16. A method according to claim 15, wherein said selecting step includes the step of pairing by twos.

17. A method according to claim 15, wherein said selecting step includes the step of varying source dimensions of the original image.

18. A method according to claim 15, wherein said selecting step includes omitting rows and columns of pixels from the original.

19. A method according to claim 15, wherein said selecting step is designed to yield first and second scaled images that differ from each other.

20. A method according to claim 11, further comprising the step of repeatedly scaling additional portions of the original so as to obtain additional images whose size is the target size of the scaled image, and combining newly-scaled portions with already-scaled portions.

21. Apparatus for building a scaled image of an original comprising:

input means for inputting an original image;

a portion selector for selecting overlapping portions of the original image;

a scaler for scaling portions of the original image selected by said portion selector; and a combiner for combining scaled portions of the original.

22. An apparatus according to claim 21, wherein the portion selector selects a first portion which is the entire original image and a second portion which is substantially the entire original image.

23. An apparatus according to claim 21, wherein the first and second portions are each comprised by substantially the entire original image.

24. An apparatus according to claim 21, wherein the portion selector selects a second portion which is different from a selected first portion.

25. An apparatus according to claim 24, wherein said selector selects portions by pairing by twos.

26. An apparatus according to claim 24, wherein said selector varies source dimensions of the original image.

27. An apparatus according to claim 24, wherein said selector selects portions by omitting rows and columns of pixels from the original.

28. An apparatus according to claim 24, wherein said scaler yields first and second scaled images that differ from each other.

29. An apparatus according to claim 21, wherein said scaler repeatedly scales additional portions of the original so as to obtain additional images whose size is the target size of the scaled image, and wherein said combiner combines newly-scaled portions with already-scaled portions.

30. Apparatus for building a scaled image of an original comprising:

an image memory for storing a bitmap image of the original;

a program memory for storing program instruction sequences; and a processor for executing the instruction sequences stored in said program memory;

wherein the instruction sequences stored in said memory include steps for (a) scaling a first portion of the original so as to form a first image whose size is the target size of the scaled image, (b) scaling a second portion of the original so as to form a second image whose size is also the target size of the scaled image, and (c) combining the first and second images to form the scaled image.

31. An apparatus according to claim 30, wherein the instruction sequence stored in said program memory includes a step of combining the first and second images with a binary OR operation.

32. An apparatus according to claim 30, wherein the instruction sequence stored in said program memory includes a step of designating the first portion as the entire original image and the second portion is substantially the entire original image.

33. An apparatus according to claim 30, wherein the first and second portions are each comprised by substantially the entire original image.

34. An apparatus according to claim 30, wherein instruction sequences stored in said program memory further includes the step of selecting the first and second portions.

35. An apparatus according to claim 34, wherein instruction sequences stored in said program memory include the step of pairing by twos.

36. An apparatus according to claim 34, wherein said instruction sequence stored in said program memory includes the step of varying source dimensions of the original image.

37. An apparatus according to claim 34, wherein program instruction sequences stored in the program memory includes omitting rows and columns of pixels from the original.

38. An apparatus according to claim 34, wherein the instruction sequence stored in said program memory is designed to yield first and second scaled images that differ from each other.

39. An apparatus according to claim 30, wherein program instruction sequences stored in the program memory further includes the step of repeatedly scaling additional portions of the original so as to obtain additional images whose size is the target size of the scaled image, and combining newly-scaled portions with already-scaled portions.

40. An apparatus for displaying scaled images of an original comprising:

a display for displaying graphical images;

an image memory for storing a bitmap image of an original;

an operator interface by which an operator may manipulate images displayed on said display;

a program memory for storing program instruction sequences including program instruction sequences for executing an application program which responds to requests from said operator interface, the application program being written using functions from a software development bit, the functions including a scaling function; and a processor for executing the instruction sequences stored in said program memory;

wherein the instruction sequences include steps for (a) executing the application program so as to display a graphical interface, (b) designating an original image which is to be scaled to a target sized image (c) executing the scaling function so as to obtain a first scaled image from a first portion of the original, the size of the first scaled image being the same as the target size, (d) executing the scaling function so as to obtain a second scaled image from a second portion of the original, the second portion overlapping the first portion, the size of the second scaled image being the same as the target size, (e) combining the first and second images to form the scaled image, and (f) displaying the scaled image with the application program.

41. An apparatus according to claim 40, wherein the instruction sequence stored in said program memory includes the step of combining the first and second images with a binary OR operation.

42. An apparatus according to claim 40, wherein instruction sequences stored in said program memory includes designating the first portion as the entire original image and the second portion as substantially the entire original image.

43. An apparatus according to claim 40, wherein the first and second portions are each comprised by substantially the entire original image.

44. An apparatus according to claim 40, wherein program instruction sequences stored in the program memory further includes the step of selecting the first and second portions.

45. An apparatus according to claim 44, wherein program instruction sequences stored in the program memory include the step of pairing by twos.

46. An apparatus according to claim 44, wherein program instruction sequences stored in the program memory include the step of varying source dimensions of the original image.

47. An apparatus according to claim 44, wherein program instruction sequences stored in the program memory includes omitting rows and columns of pixels from the original.

48. A method according to claim 44, wherein the instruction sequence stored in said program memory is designed to yield first and second scaled images that differ from each other.

49. An apparatus according to claim 40, wherein program instruction sequences stored in the program memory further includes the step of repeatedly scaling additional portions of the original so as to obtain additional images whose size is the target size of the scaled image, and combining newly-scaled portions with already-scaled portions.

* * * * *